(No Model.)
P. MÜHLHÄUSER.
APPARATUS FOR OBSERVING THE QUALITY OF LIQUIDS IN KEGGING.
No. 257,049. Patented Apr. 25, 1882.
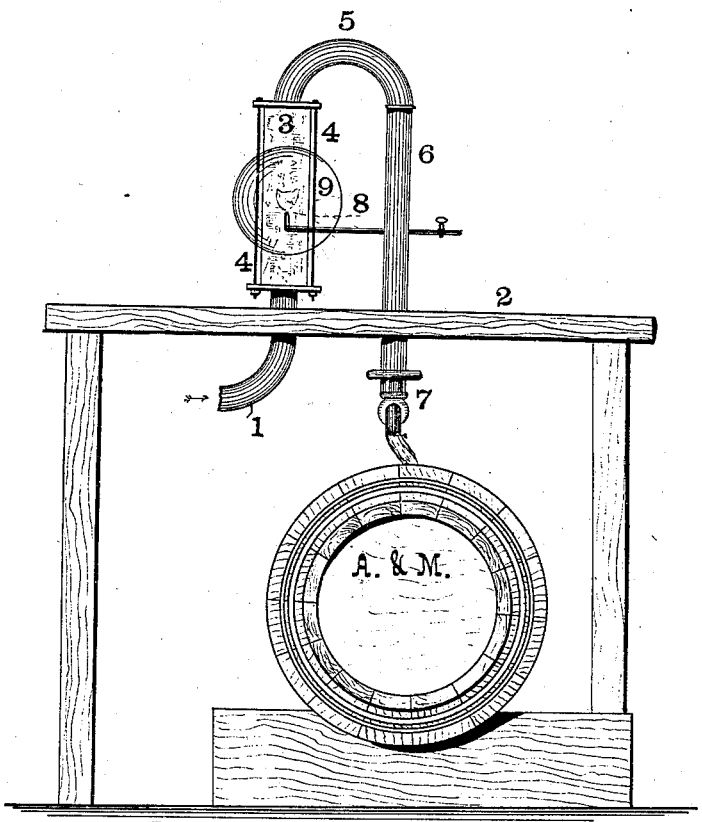
WITNESSES.
INVENTOR
Paul Mühlhäuser
BY
ATTORNEY.

UNITED STATES PATENT OFFICE.

PAUL MÜHLHÄUSER, OF BALTIMORE, MARYLAND.

APPARATUS FOR OBSERVING THE QUALITY OF LIQUIDS IN KEGGING.

SPECIFICATION forming part of Letters Patent No. 257,049, dated April 25, 1882.

Application filed March 21, 1881. Renewed March 14, 1882. (No model.)

*To all whom it may concern:*

Be it known that I, PAUL MÜHLHÄUSER, of Baltimore city, State of Maryland, have invented certain new and useful Improvements in Apparatus for Observing the Quality of Liquids in Kegging; and I hereby declare the same to be fully, clearly, and exactly described as follows, reference being had to the accompanying drawing, in which the apparatus is shown in front elevation.

My invention has for its object to obviate what has heretofore been a fruitful source of annoyance to brewers, and has occasioned much loss to them by reason of the reclamations of the retail dealers.

To a distinct understanding of the exact nature and scope of my invention, a short description of the brewing process immediately germane thereto will be conducive. After passing through the kraeusen stage the beer is treated in the tuns with isinglass, in order to separate the particles of yeast-plant and other impurities and clarify the beer. In the bottoms of the tuns is placed a quantity of beech-chips, which rest on the bottom and on which the impurities subside. From these tuns the beer is drawn off to the kegs or casks, and necessarily, in order to empty the tuns, the pipes through which the beer is drawn enter the tuns near the bottom and below the level of the chips or shavings. Now, inasmuch as the chips are but little heavier than the beer, they are liable to be displaced or agitated as the level in the tuns lowers, and as a consequence the adhering yeast-plants and impurities are liable to be dislodged and pass off through the pipe into the keg. Heretofore they have done so unnoticed, and the brewer was first made aware of the fact when the retail dealer presented his reclamation on account of the beer in the keg having been unsalably muddy. I obviate this by providing a means for instantly detecting any muddiness of the beer due to a disturbance of the chips or other cause.

In the drawing, 1 is the pipe leading from the tun, and 7 is the cock for drawing the beer off into the keg. Heretofore these parts have been in immediate connection, but I interpose between them a glass or transparent section, 3, above the table 2, and secured to the bend 5 by tie-rods 4. The bend 5 is in communication with the pipe 6, that leads to the cock 7. From the latter the usual flexible tube leads to the bung-hole of the keg. Behind the section 3 is located a lamp or gas-jet, 8, and reflector 9. Being circular in cross-section, and therefore transversely lenticular, the tube 3, illuminated by the jet 8 and reflector 9, reveals the slightest muddiness or impurities of the beer as the same rise through the tube. On discovering that the flowing beer is muddy the cock is immediately closed and the keg is filled from another tun, while the impurities in that from which the keg was first being filled are allowed to settle.

The advantage and importance of the device are at once apparent. It is readily applicable to the tap-pipes of breweries as at present in use, and that at a cost which is more than offset by the first reclamation which the use of the device avoids.

What I claim is—

1. In combination with the tap-pipe and cock, the transparent illuminated section 3, as set forth.

2. In combination with the tap-pipe and transparent section, the jet 8, as set forth.

3. In combination with the tap-pipe having vertical transparent section and cock 7, the jet 8, as set forth.

4. In combination with the pipe 1 and vertical transparent section 3, the pipes 5 6, cock 7, jet 8, and reflector 9, as set forth.

PAUL MÜHLHÄUSER.

Witnesses:
R. D. WILLIAMS,
J. C. GITTINGER.